United States Patent [19]
Zucco

[11] 3,795,055
[45] Mar. 5, 1974

[54] APPARATUS FOR DIMENSIONAL TESTING OF NOMINALLY CYLINDRICAL WORKPIECES

[75] Inventor: Matteo Zucco, Turin, Italy

[73] Assignee: Fiat Societa Per Azioni, Turin, Italy

[22] Filed: May 25, 1972

[21] Appl. No.: 256,854

[30] Foreign Application Priority Data
May 28, 1971  Italy.............................. 68817 A/71

[52] U.S. Cl. ............................................ 33/174 Q
[51] Int. Cl. ........................... G01b 5/08, G01b 5/20
[58] Field of Search .................................. 33/174 Q

[56] References Cited
UNITED STATES PATENTS
2,547,719  4/1951  Rosser .............................. 33/174 Q
2,240,184  4/1941  Hathaway ......................... 33/147 N FOREIGN PATENTS OR APPLICATIONS
615,024   1/1961  Italy ................................. 33/174 Q Primary Examiner—Robert B. Hull
Assistant Examiner—Richard R. Stearns
Attorney, Agent, or Firm—Sughrue, Rothwell, Mion, Zinn & Macpeak

[57] ABSTRACT

This invention provides a testing apparatus for nominally cylindrical workpieces enabling errors of both form and concentricity of a workpiece to be assessed, independently of workpiece diameter, while also checking the diameter itself. The workpiece is rotated about a longitudinal axis through at least 180° and two adjustable feelers are maintained in contact with diametrically opposite points on the surface of the workpiece, one feeler being carried by one arm of a forked support while the other feeler is carried by an block capable of lateral displacement relative to the other fork arm, both the forked support and the block being displaceable linearly in a lateral direction by virtue of ligament supports. A transducer responsive to workpiece diameter is carried by the forked support and bears against a reference point in the ligament support for the block which does not exhibit any lateral shifting upon change in workpiece diameter.

1 Claim, 6 Drawing Figures

APPARATUS FOR DIMENSIONAL TESTING OF NOMINALLY CYLINDRICAL WORKPIECES

BACKGROUND OF THE INVENTION

This invention relates to apparatus for dimensional testing of nominally cylindrical workpieces, such as turned shafts, gears, and the like, with particular reference to the testing of the diameter of such workpieces and the registration of errors of concentricity and shape.

Normally such workpiece testing is carried out with two different test instruments, entailing two separate positionings of the workpiece to be tested upon each instrument, and necessitating two different operators. In this case the accuracy of the two testing operations may often be influenced by human error.

It is in any case necessary to have available qualified personnel able to carry out, with the requisite care and skill, the two separate testing operations.

An object of the present invention is to avoid these difficulties and disadvantages by providing an apparatus which allows, with a single positioning of a workpiece, testing of the diameter to check that it lies within predetermined limits of tolerance, and simultaneous testing for errors in concentricity and form, independently of the dimensions of the workpiece.

Another object of the invention is to provide an apparatus of the aforesaid type, which ensures constant measuring and checking accuracy, whilst also allowing the use of personnel which are not highly skilled and minimising errors due to the human element.

A further object of the invention is to provide an apparatus of the aforesaid type capable of use in gauges and modulating elements.

Yet another object of the invention is to provide a device of the aforesaid type which is of simple, robust and economic construction, accurate and durable in operation and simple and convenient to use.

SUMMARY OF THE INVENTION

According to the invention there is provided an apparatus for testing errors of concentricity and form of a nominally cylindrical workpiece, independently of the workpiece diameter, and for checking, at the same time, that the diameter of the workpiece is within predetermined limits of tolerance, the apparatus comprising support means for the workpiece permitting rotation of the workpiece about a longitudinal axis, an oscillatory forked support supported from a fixed base by ligaments and permitting lateral displacement of the forked support relative to the fixed base, two adjustable feelers adapted to come into contact with the outer surface of the workpiece at diametrically opposed points, one of the said feelers being carried by one of the arms of the forked support and the other of said feelers being carried by an oscillatory block connected by means of ligaments to the other arm of the forked support, a first transducer, sensitive to the workpiece diameter, carried by the forked support and co-operating with the said oscillatory block, and a second transducer, sensitive to workpiece eccentricity, carried by a fixed mounting and cooperating with a reference point which is common to the forked support and the oscillatory block and which is so placed as not to be urged in the direction of the axis of rotation of the workpiece by movements due to departures of the workpiece diameter from a standard diameter in relation to the axis of rotation, whereby rotation of the workpiece through at least 180° makes it possible to measure at the same time the error of the workpiece diameter and possible error in concentricity of the workpiece, the latter error being measured independently of the workpiece diameter, and means for connecting said transducers to a signal processing instrument for evaluating the signals provided by the transducers and providing an indication of whether or not said signals are within acceptable limits.

BRIEF DESCRIPTION OF THE DRAWINGS

Further characteristics and advantages of the invention will be apparent from the following description, given by way of non-limiting example, with reference to the attached drawings, in which.

DETAILED DESCRIPTION OF THE ILLUSTRATED EMBODIMENT

Figure 1:
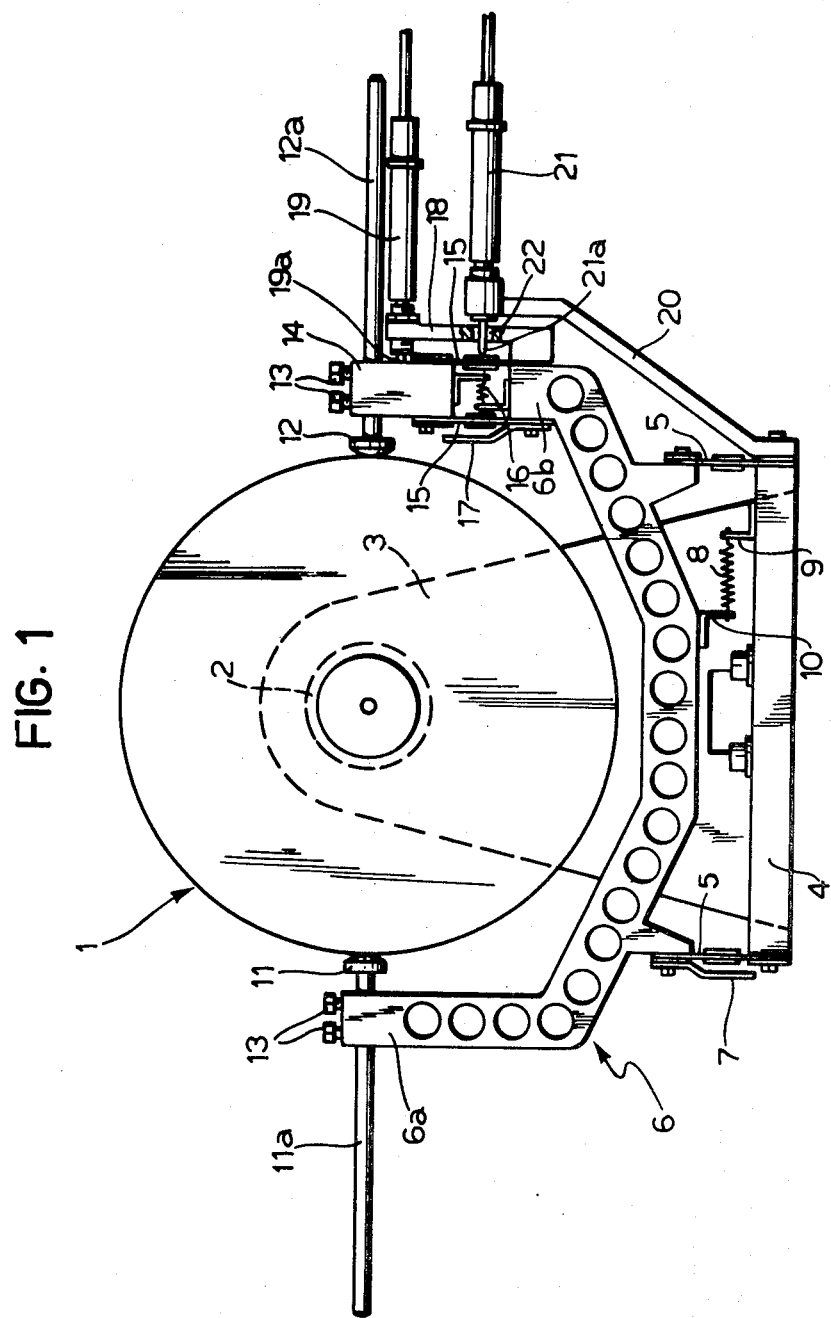
FIG. 1 is a diagrammatic and elevation of apparatus according to one embodiment of the invention for recording the errors in concentricity and form of a workpiece independently of its diameter and for simultaneously checking that the diameter is within predetermined limits of tolerance.
Figure 2:
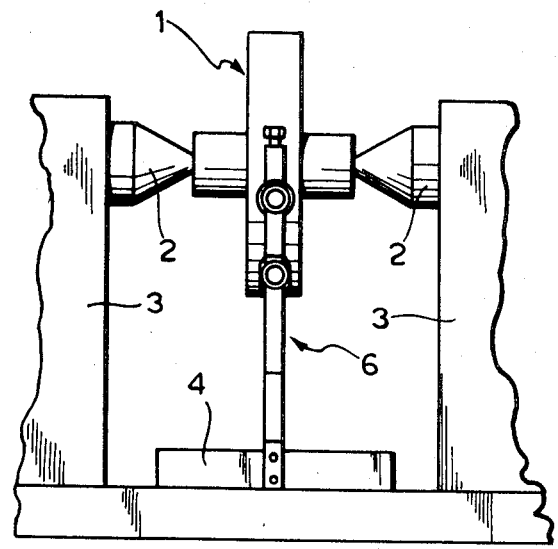
FIG. 2 is a diagrammatic lateral elevation of the apparatus on a reduced scale.

Referring to the drawings, reference numeral 1 indicates a nominally cylindrical workpiece mounted for rotation between two opposed tapered stocks 2, supported by mountings 3. Alternatively, the workpiece 1 could rest upon "V" shaped notches to allow rotation of the workpiece about its longitudinal axis.

The apparatus according to the invention comprises a fixed lower base plate 4 upon which the mountings 3 are supported. An oscillatory forked support 6 rests on the base plate 4 by means of resilient ligaments 5. The dimensions of the forked support 6 are such that it embraces the workpiece 1 to be tested.

The ligaments 5 are formed of spring steel strips, reinforced intermediate their ends by non-distorting plates which allow flexion of the strips only near their points of connection to the plate 4 and the support 6. The forked support 6 is therefore connected to the plate 4, in effect, by means of a vertical articulated parallelogram the upstanding sides of which are formed by the said ligaments 5.

A helical spring 8 extends between two anchorages 9, 10 integral respectively with the fixed base plate 4 and the forked support 6. The spring 8 biases the forked support 6 towards a predetermined position. One of the arms 6a of the forked support 6 carries a first feeler 11 located at one end of a laterally extending sliding rod 11a the axis of which intersects the axis of rotation of the workpiece 1. A second feeler 12, borne by a similar sliding rod 12a coaxial with the rod 11a, is held in counterposed relation to the first feeler 11, in contact with a diametrically opposite part of the workpiece 1. The sliding rod 12a is carried by a small oscillatory block 14, connected to the other arm 6b of the forked support 6. Setscrews 13 in the block 14 and arm 6a make possible the clamping of the feeler rods 11a and 12a in a desired position.

The oscillatory block 14 is connected to the arm 6b of the forked support 6 by means of another pair of resilient ligaments 15, similar to the ligaments 5 which connect the forked support 6 to the fixed plate 4. The block 14 is subject to the action of a helical return spring 16.

Two fixed stops 7 and 17 are arranged to limit the oscillatory strokes of the forked support 6 and the oscillatory block 14 respectively.

On the arm 6b of the forked support 6 there is mounted a fixed bracket 18 which carries a first electronic transducer 19 for measuring the diameter of the workpiece 1. The transducer 19 has a sensing tip 19a which bears against the oscillatory block 14. Another fixed bracket 20, mounted on the lower fixed plate 4, supports a second electronic transducer 21 for measuring the workpiece eccentricity. The transducer 21 has a sensing tip 21a which passes through a hole 22 in the bracket 18 and bears against one of the ligaments 15 which connect the block 14 to the arm 6b of the forked support 6.

By means of the apparatus herein described it is possible to measure the diameter and the relative ovality error of the workpiece 1, registered by the electronic transducer 19, and at the same time to measure the concentricity error, or eccentricity, of the workpiece by means of the second electronic transducer 21.

In order to define the degree of eccentricity and the magnitude of the ovality error, it is necessary to cause the workpiece 1 to rotate about the axis of the stocks 2 (or the axis of the "V" supports) through an angle of 180°, that is, one half-rotation. During this half-rotation the two transducers 19, 21 independently provide instantaneous signals representative of the errors of concentricity and ovality respectively.

The device allows the imposition of tolerance limits. Thus if the deviations registered by the two transducers 19, 21 with reference to their respective normal positions, or zero settings, are comprised within predetermined limits, an electronic instrument (not illustrated) connected to the two transducers provides an assenting signal, whilst conversely if these deviations are outside the said predetermined limits a visual or audible signal is provided indicating that the workpiece is not up to standard.

In principle it is possible by means of the apparatus to record directly the eccentricity error with fixed imposition of tolerance limits, independently of the workpiece diameter, thus avoiding zero setting of the measuring instrument, in order to compensate for deviations due to error in the actual diameter of the workpiece. This is a consequence of the fact that the eccentricity error is measured at a point of reference identified by the letter P (FIG. 3), that is, the tip 21a of the transducer 21, which is not displaced in the direction of the axis of rotation as a result of any increase or decrease in the diameter of the workpiece 1. Naturally the instrument has to be set at zero initially with the aid of a specimen or standard workpiece.

Figure 3:
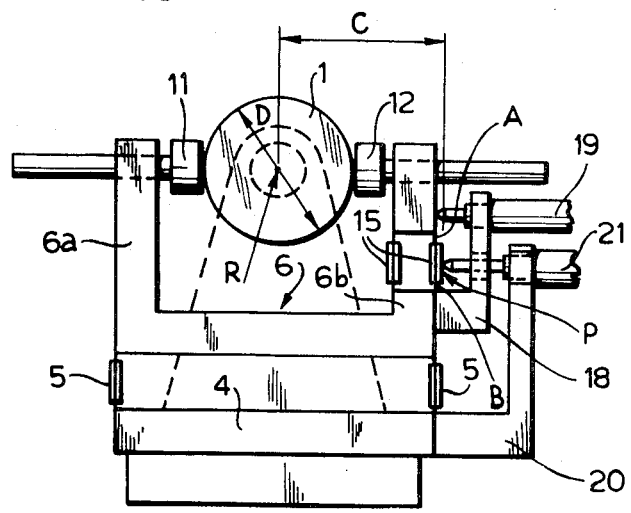
FIGS. 3, 4, 5 are diagrammatic views corresponding to FIG. 1, illustrating the operation of the apparatus in three different cases.
Figure 4:
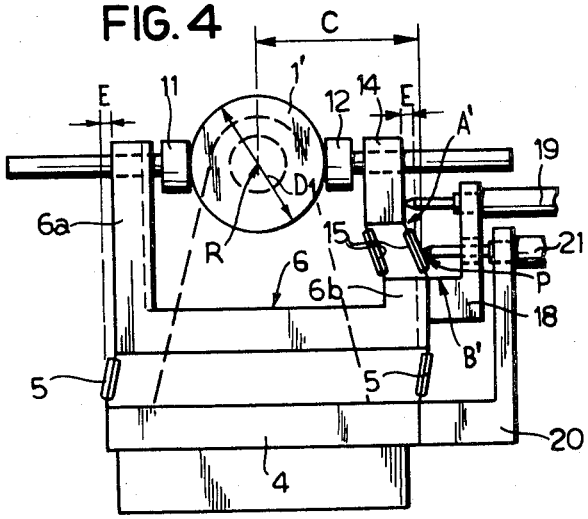
Figure 5:
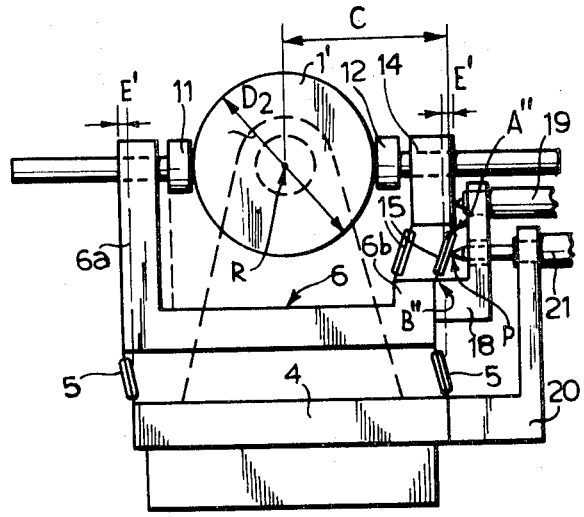

In FIGS. 3, 4 and 5 there is shown diagrammatically the action of the apparatus when testing a workpiece where: (a) the diameter of the workpiece corresponds to that of a reference standard (FIG. 3); (b) the diameter is less than that of the standard (FIG. 4) and (c) the diameter is greater than that of the standard (FIG. 5).

Any discrepancy between the workpiece diameter and the standard diameter does not affect the reading of the transducer 21 which records the eccentricity since the horizontal distance C between the point P and the nominal centre R (FIG. 3), taken as the centre of the standard diameter D in question and not to be confused with the axis of rotation of the workpiece, remains constant. If, as shown in FIG. 4, the workpiece 1' has a diameter $D_1$ which is less than the standard diameter D, then the two feelers 11, 12 are each displaced a distance E towards the workpiece, equal to half the difference of the diameters $(D-D_1)$. The feeler 11, shown in the drawings to the left of the workpiece 1, approaches the workpiece as the forked support 6 itself moves towards the right, whilst the other feeler 12 approaches the workpiece inasmuch as the block 14 moves by an equal amount leftwards.

Figure 6:
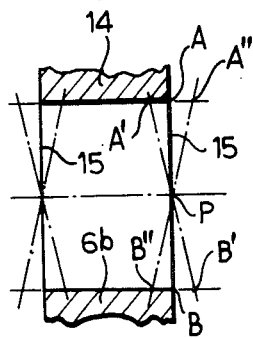
FIG. 6 is a geometric diagram illustrating one detail of the apparatus.

Now if one considers, as shown in FIG. 6, the articulated parallelogram formed by the ligaments 15, the block 14 and the arm 6b of the forked support, it will be seen that the points of connection A and B of one of the ligaments 15 to the block 14 and the arm 6b respectively move by equal amounts in opposite directions upon relative displacement of the block 14 and the arm 6b, as illustrated by the positions A', B' and A'', B'' typically occupied by the points A, B upon displacement between the block 14 and the arm 6b in opposite directions. The position of the centre of the ligament 15, corresponding to the point P, will remain unchanged. The same thing happens, as shown in FIG. 5, if the diameter $D_2$ of the workpiece 1' is greater than the standard, in which case the two feelers 11 and 12 move outwards by the same distance E'. This makes it possible to measure the concentricity independently of the diameter of the workpiece, without any preventative adjustment of the apparatus.

It will be appreciated that constructional details of practical embodiments of the invention may be varied widely from that which has been described and illustrated, without nevertheless going beyond the scope of this invention.

I claim:

1. Apparatus for testing errors of concentricity and form of a nominally cylindrical workpiece, independently of the workpiece diameter, and for checking, at the same time, that the diameter of the workpiece is within predetermined limits of tolerance, said apparatus comprising:

a. workpiece support means permitting rotation of the workpiece about a longitudinal axis;
   b. a base fixed with respect to said workpiece support means;
   c. a forked support;
   d. a first pair of ligaments mounting said forked support on said base and constituting with the base and the support a first articulated parallelogram permitting lateral displacement of said forked support relative to said base;
   e. two adjustable feelers adapted to come into contact with the outer surface of the workpiece at diametrically opposed points, one of said feelers being carried by one of the arms of the forked support;
   f. a block carrying the other of said feelers;
   g. a second pair of ligaments supporting said block from the other arm of said forked support and constituting with the block and the support a second articulated parallelogram permitting lateral displacement of the block relative to the support;
h. a first transducer, sensitive to the workpiece diameter, carried by the forked support and providing a signal related to the position of said block with respect to said forked support;
i. mounting means fixed relative to said base;
j. a second transducer, sensitive to workpiece eccentricity, carried by said mounting means and providing a signal related to the position with respect to said mounting means of a reference point which is the center point of one of said second pair of ligaments, and
k. means for connecting said transducers to a signal processing instrument for evaluating the signals provided by said transducers and providing an indication of whether or not said signals are within acceptable limits.

* * * * *